Figure 1:
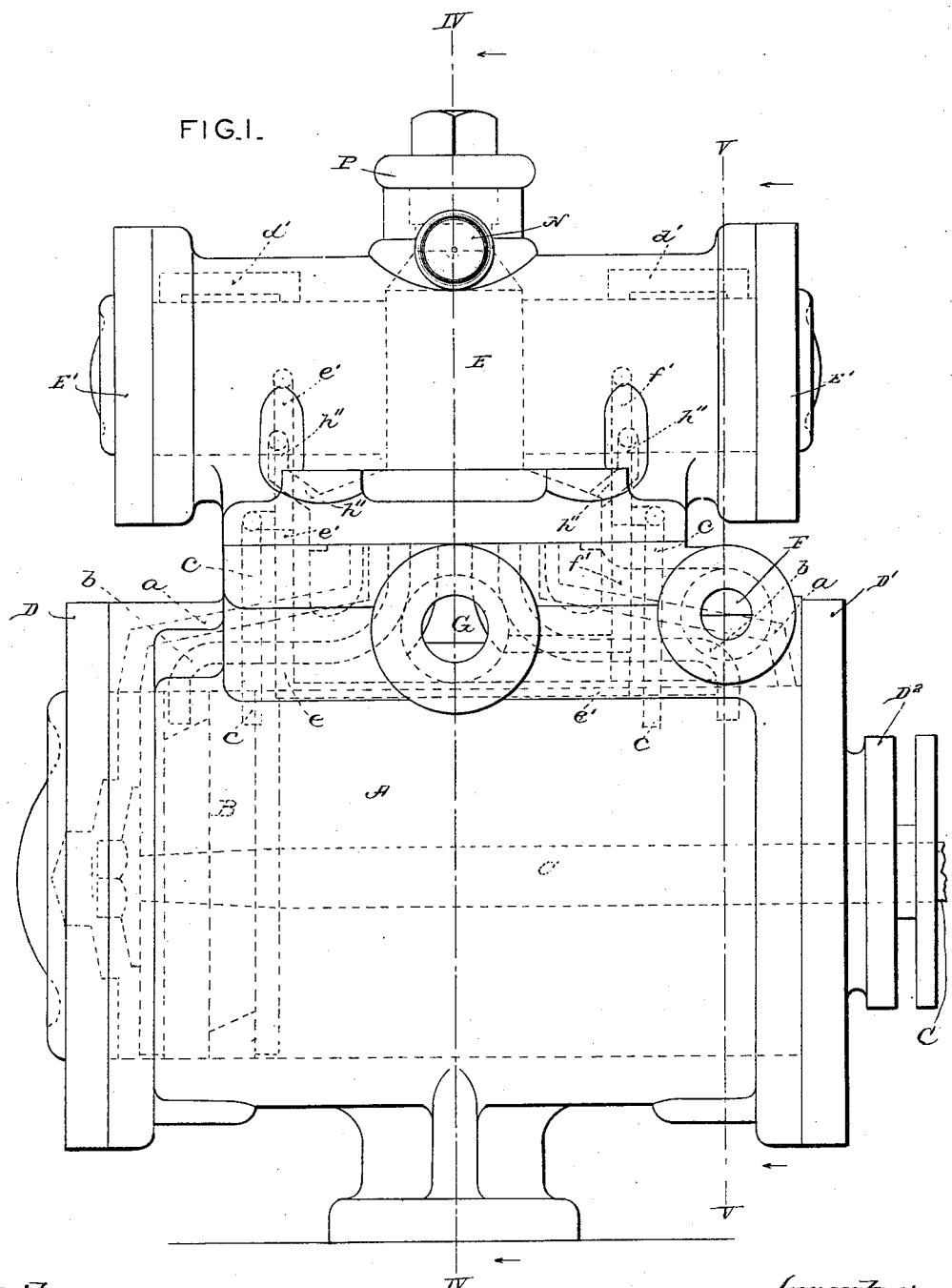

(No Model.) 7 Sheets—Sheet 1.
W. H. BLAKE.
STEAM ACTUATED VALVE.

No. 480,167. Patented Aug. 2, 1892.

Witnesses:
Harry S. Rohrer.
Wm. E. Knight.

Inventor:
William H. Blake.
By Knight Bros.
Attorneys

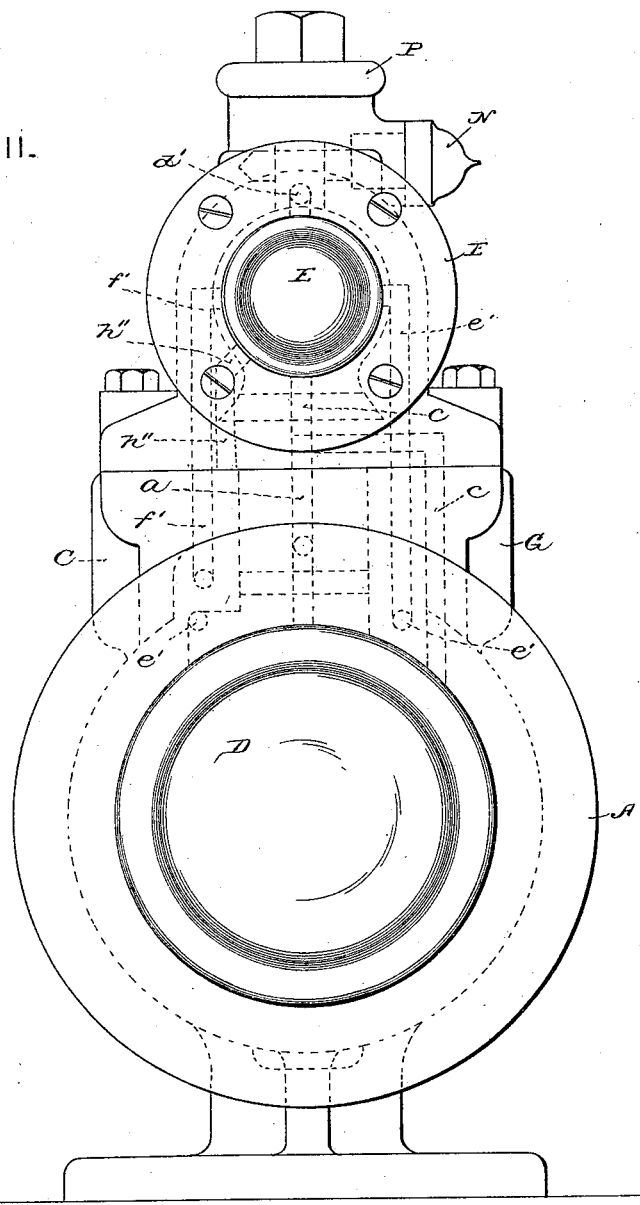

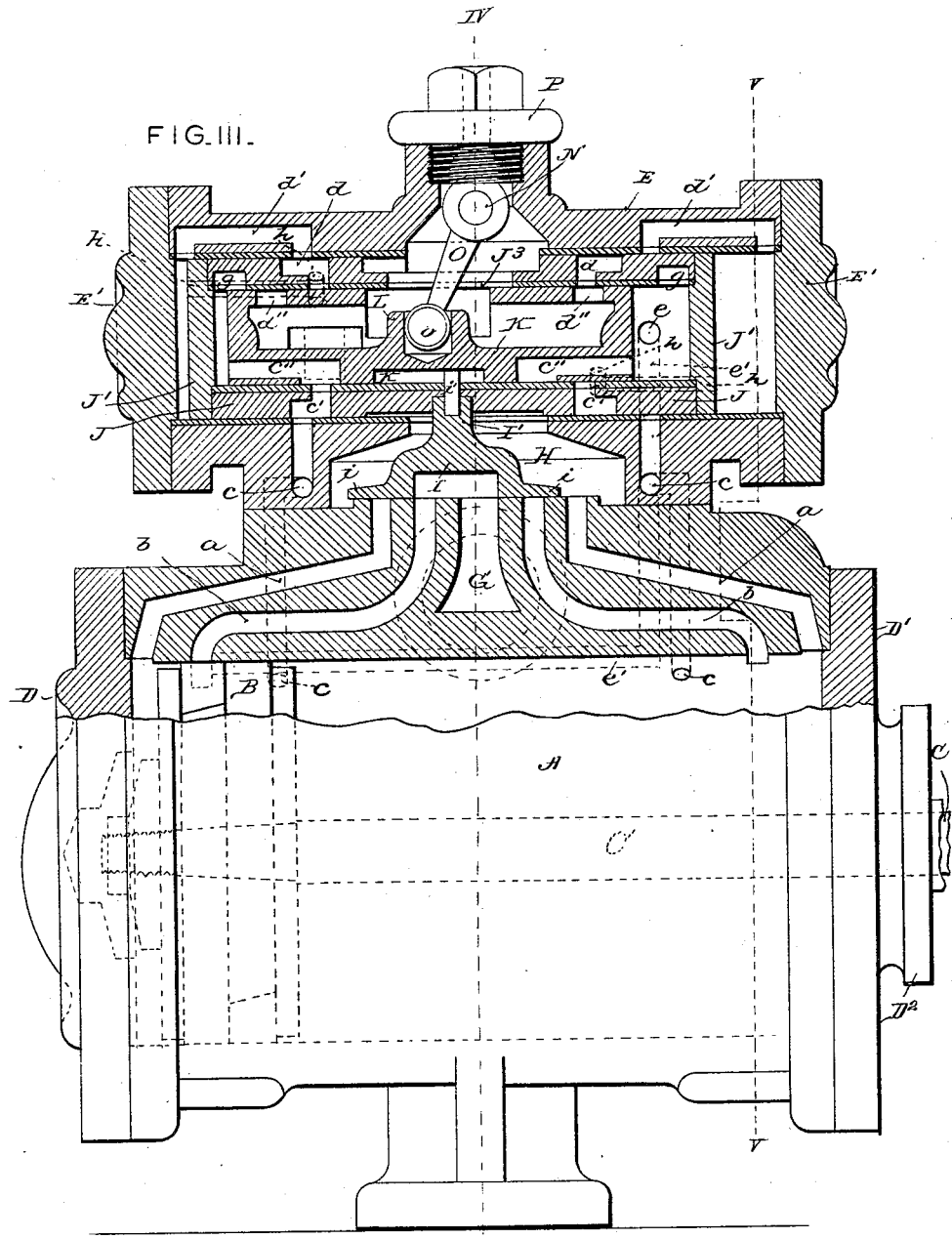

(No Model.) 7 Sheets—Sheet 4.
W. H. BLAKE.
STEAM ACTUATED VALVE.
No. 480,167. Patented Aug. 2, 1892.
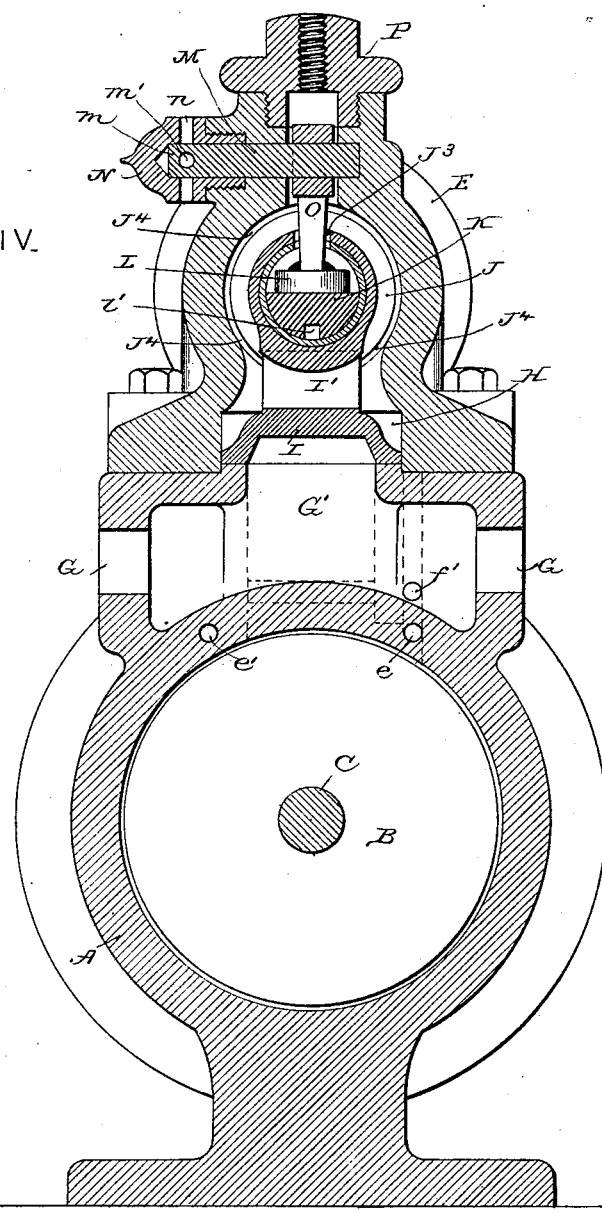
FIG. IV.
Witnesses:
Harry S. Rohrer
Wm. E. Knight.
Inventor:
William H. Blake.
By Knight Bros.
Attorneys.

(No Model.) 7 Sheets—Sheet 5.
W. H. BLAKE.
STEAM ACTUATED VALVE.
No. 480,167. Patented Aug. 2, 1892.
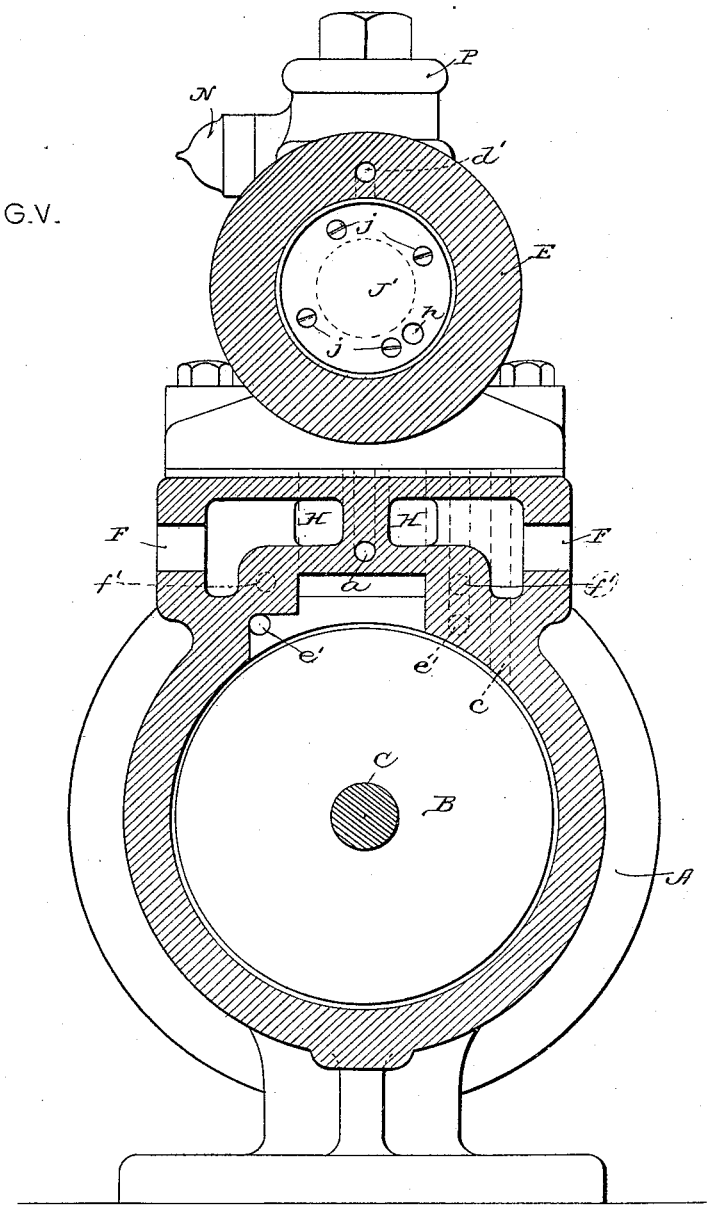
FIG. V.
Witnesses:
Harry S. Rohrer
Wm. E. Knight
Inventor:
William H. Blake
By Knight Bros
Attorneys (No Model.) 7 Sheets—Sheet 6.
W. H. BLAKE.
STEAM ACTUATED VALVE.
No. 480,167. Patented Aug. 2, 1892.
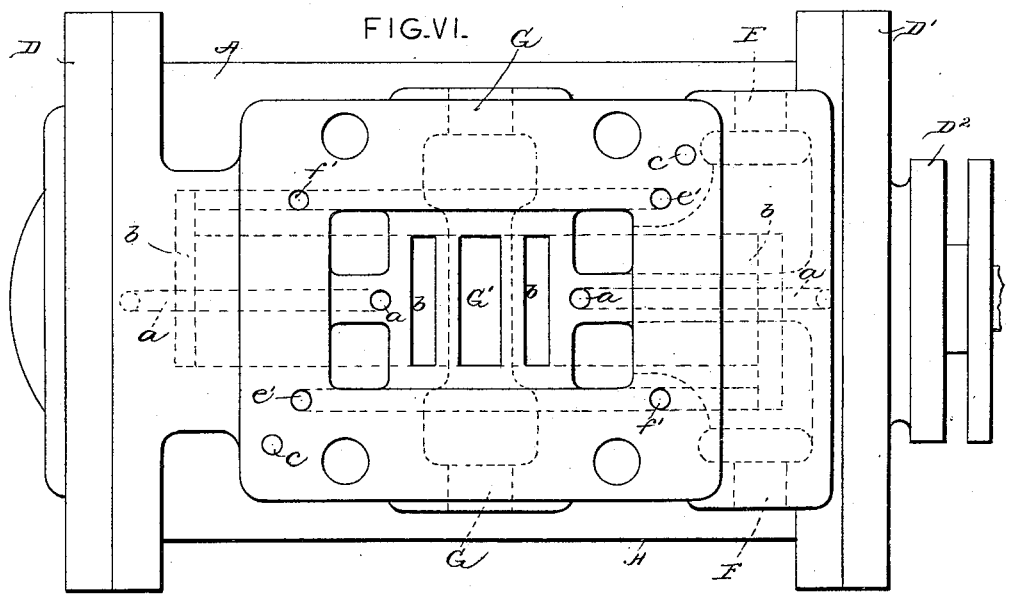
FIG. VI.
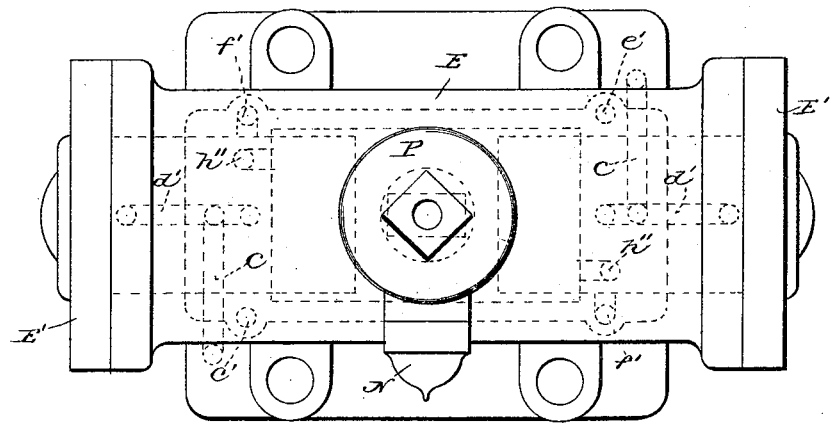
FIG. VII.
Witnesses:
Harry T. Rohrer
Wm E. Knight
Inventor:
William H. Blake
By Knight Bros
Attorneys.

(No Model.) W. H. BLAKE. 7 Sheets—Sheet 7.
STEAM ACTUATED VALVE.
No. 480,167. Patented Aug. 2, 1892.
FIG. VIII.
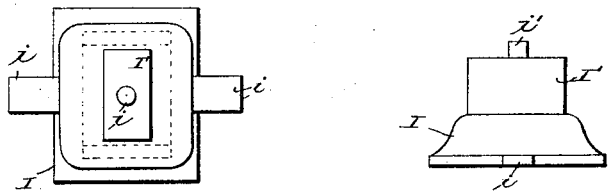
FIG. X.ᵃ  FIG. IX.  FIG. X.
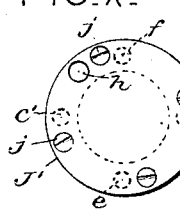 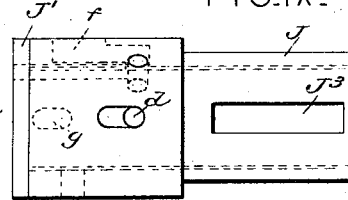 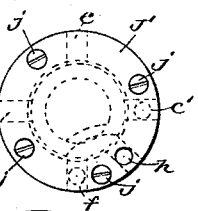
FIG. XI. FIG. XII.
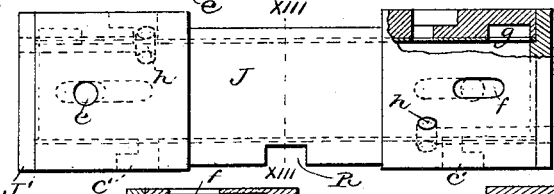 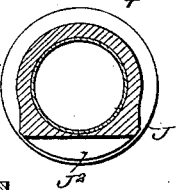
FIG. XIII.
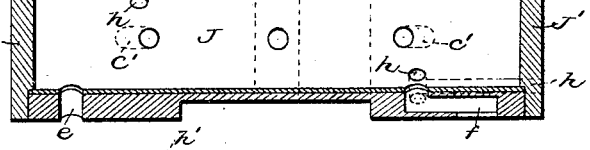
FIG. XIV. FIG. XVI.
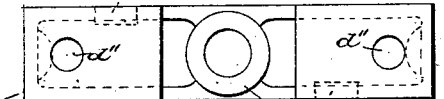
FIG. XV.
FIG. XVIII.
FIG. XVII.
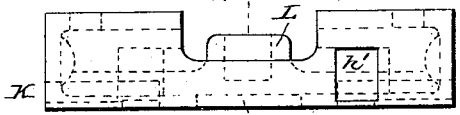
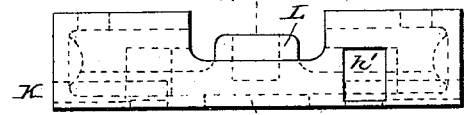
Witnesses:
Harry S Rohgu
Wm E Knight
Inventor:
William H. Blake.
By Knight Bros
Attorneys.

UNITED STATES PATENT OFFICE.

WILLIAM H. BLAKE, OF WARREN, MASSACHUSETTS.

STEAM-ACTUATED VALVE.

SPECIFICATION forming part of Letters Patent No. 480,167, dated August 2, 1892.

Application filed February 12, 1892. Serial No. 421,295. (No model.)

*To all whom it may concern:*

Be it known that I, WILLIAM H. BLAKE, a citizen of the United States, residing at Warren, in the county of Worcester and State of Massachusetts, have invented certain new and useful Improvements in Steam-Actuated Valves for Engines; and I do hereby declare that the following specification, taken in connection with the accompanying drawings, which form a part thereof, is a full, clear, and exact description of my improvements, such as will enable those skilled in the arts to make and use the same.

Broadly considered, my present invention is an improvement on my former patent, No. 428,449, granted May 20, 1890, for steam-actuated valves for engines, and, like said patent, the valve and accessories are so constructed that extraneous mechanism for imparting the preliminary movement to the primary valve-piston is dispensed with and a supplemental valve-piston is provided for imparting said movement.

My present invention is also particularly applicable to steam pumping-engines and other direct-acting engines.

My invention relates to that class of steam-actuated valves which employs an automatic supplementary valve-piston for controlling the passage of steam to actuate the piston, by which motion is imparted to the primary slide-valve, and more particularly my improvements relate to that form of valve-movement in which the supplementary piston is supported within the primary valve-piston, said primary valve-piston forming a cylinder for the supplementary piston to reciprocate in; and my invention consists of certain new details of construction and arrangements of parts, all of which will first be described with reference to the accompanying drawings, and then more particularly defined by the claims.

In said drawings, Figure I is a side elevation of a portion of a direct-acting steam-pump with my improvements applied thereto. Fig. II is an end elevation of the same, representing in dotted lines the direction of the steam-ducts. Fig. III is a vertical longitudinal section of the same, representing the main piston at the outer end of its stroke and the primary and secondary valve-pistons in readiness to make their return strokes for reversing the slide-valve. Fig. IV is a transverse vertical section taken on the line IV IV of Fig. I. Fig. V is a transverse vertical section taken on the line V V of Fig. I. Fig. VI is a top view of the main steam-chest with the auxiliary steam-chest and slide-valve removed. Fig. VII is a top view of the auxiliary steam-chest, representing in dotted lines the direction of some of the steam-ducts. Fig. VIII represents in top view and end elevation the construction of the slide-valve. Fig. IX is a top view of the primary valve-piston removed from the steam-chest. Figs. X and $X^a$ are end views of the same. Fig. XI is a side elevation of the same, part being broken away. Fig. XII is a vertical transverse section, and Fig. XIII is a horizontal longitudinal section, of the same. Figs. XIV, XV, and XVI are respectively a top view, side elevation, and end view of the secondary valve-piston. Figs. XVII and XVIII are respectively a horizontal longitudinal section and a vertical transverse section of the same.

Like letters of reference indicate the same parts throughout the several views.

A represents the main steam-chest or engine-cylinder; B, the main piston working therein and secured on the outer end of the piston-rod C.

D is the outer head of the steam-chest, and D' the inner head thereof, provided with the customary stuffing-box $D^2$.

E is the auxiliary steam-chest, secured on top of the main steam-chest in any suitable manner.

F are the steam-supply ports, and G the exhaust-ports, communicating with a chamber H between the auxiliary steam-chest and main steam-chest in the customary manner.

G' is the large central duct leading from the chamber H to the exhaust G. *b b* are two large steam-ducts communicating between said chamber and the opposite ends of the main steam-chest, and *a a* are two small steam-ducts communicating between said chamber and the opposite ends of the main steam-chest.

I is a D slide-valve adapted to form a communication between the exhaust G and either one of the steam-ducts *b* and at the same time to open the other duct *b* into communication with the live steam in the chamber H.

Said slide-valve has formed on its opposite ends projecting lugs or lips $i\ i$, adapted to alternately close and open the small steam-ducts $a\ a$. The valve I has an upwardly-projecting rib I', from the top of which extends a cylindrical lug $i'$.

J is the primary valve-piston, supported in the auxiliary steam-chest E, said steam-chest being provided with the removable heads E' E'. The valve-piston J is formed of a hollow cylinder or shell having removable heads J' J', which are secured thereto by small flat-headed machine-screws $j$, said heads being counterbored, so that the screws will come flush therewith.

K is the secondary valve-piston, supported inside of the primary valve-piston J, so as to reciprocate therein. The upwardly-projecting rib I' of the valve I engages in an opening $J^2$, formed in the bottom wall of the shell-piston J, and the cylindrical lug $i'$ passes through the piston J and engages in a longitudinal groove $k$, formed in the bottom of the valve-piston K. By so connecting the valve I to the primary valve-piston J and the secondary valve-piston K the valve is reciprocated by the movement of the primary valve-piston and both the primary and secondary valve-pistons are prevented from rolling.

In the operation of my improved valve-movement the main piston controls the secondary valve-piston, the secondary valve-piston controls the primary valve-piston, and the primary valve-piston controls the slide-valve, which admits the steam to and from the main steam-chest for reciprocating the main piston.

The various ports and ducts and their manner of operation will now be described.

Referring particularly to Fig. III, which represents the position of the parts at the moment when the main piston is completing its outward stroke, it will be observed that the main steam-chest is taking steam at its inner end through the ports $a$ and $b$, which moves the piston to the left, uncovering the port $c$, which leads up through the main steam-chest and auxiliary steam-chest to the port $c'$, through the primary valve-piston, and through the port $c''$, extending longitudinally through the secondary valve-piston to the end of its steam-chest or the shell-piston J. The steam thus admitted to the left-hand end of the shell-piston J moves the secondary piston K to the right. Before the secondary piston has commenced to take its stroke to the right it will be observed that the port $d$ through the upper wall of the shell-piston J is in communication with the duct $d'$, leading to the left-hand end of the auxiliary steam-chest. It will also be observed that the secondary valve-piston is formed hollow and is continually supplied with live steam through the slot $J^3$ in the top of the shell-piston J, which in turn is supplied with live steam through suitable ducts $J^4$, extending from the main steam-supply chamber H. Now as the secondary valve-piston moves to the right, as explained, the port $d''$ is brought into communication with the port $d$ and duct $d'$, which admits steam to the left-hand end of the auxiliary steam-chest and moves the primary valve-piston to the right. When the primary valve-piston has moved two-thirds of its stroke, the communication between port $d$ and duct $d'$ is cut off, leaving the piston to be driven the remainder of its stroke by the expansion of the confined steam. The movement of the primary valve-piston to the right shifts the slide-valve I, so that the ports $a$ and $b$ on the right-hand end of the steam-chest are closed and the ports $a$ and $b$ on the left-hand end of the steam-chest are open to live steam, the port $b$ on the right-hand end being the exhaust-port during the return stroke of the piston. The piston then moves to the right and the parts are in the same relative positions on the right as they were on the left at the start, a similar set of ports and ducts being provided on the right-hand end and designated by the same letters. At the end of the main piston's stroke to the right the port $c$ is opened, and the same movement of parts is gone through with for the return outward stroke.

Returning again to the position of the parts at the completion of the outward stroke of the main piston, as illustrated in Fig. III, I will now describe the manner in which the steam exhausts from the auxiliary cylinder and the primary shell-piston.

When the pistons are ready to make their return stroke, we find the exhaust-port $e$ in the right-hand end of the shell-piston in communication with the duct $e'$, which extends down through the auxiliary steam-chest into the main steam-chest and from thence over to the left-hand end of the main steam-chest, where it communicates with the main exhaust, which is cored out a little to one side for this purpose. When the secondary valve-piston takes its stroke to the right, its cylinder exhausts through said port $e$, as described, the right-hand end of said piston running across and closing said port $e$ when it has completed two-thirds of its stroke and forming a cushion of the steam entrapped. If, however, the confined-steam cushion is insufficient to arrest the movement of the secondary valve-piston and it moves five thirty-seconds of an inch farther to the right, the live-steam port $d$ is brought into communication with the cushion-port $g$ in top of the shell-piston J, thus giving the secondary valve-piston a live-steam cushion and preventing it from striking the cylinder-head. At the same moment that the exhaust-port $e$ is closed by the movement of the secondary valve-piston to the right the steam-supply is also cut off from the port $c''$, so that said secondary piston is held between two confined-steam cushions at the end of each of its strokes until the primary piston shifts, when both ends of the secondary piston are put into communication with the exhaust end of the main cylinder, as hereinafter explained, which thereby allows the main piston to steam its full stroke before admitting steam to the port $c$ and giving the pistons their return movements for reversing the valve. We also find that the exhaust-port $f$ in the right-hand end of the primary valve-piston is in communication with the duct $f'$, which extends down through the auxiliary steam-chest into the main steam-chest, where it connects with the main exhaust, as illustrated in dotted lines in the drawings.

$h$ is another port drilled through the primary piston-shell half-way between the ports $f$ and $c'$ and extending back to a point even with the point of entry of the port $f$ and leaving a wall or partition between said ports $f$ and $h$. The secondary valve-piston has formed in its side, near its end, an oblong recess $h'$, which is adapted to form a communication between the ports $f$ and $h$ when said secondary valve-piston is at the right-hand end of its stroke. It will thus be seen that when the secondary piston is at the left-hand end of its stroke the communication between the ports $f$ and $h$ is cut off, but that when said secondary piston moves to the right and opens the steam-supply to the left-hand end of the primary valve-piston it at the same time opens communication between the ports $f$ and $h$ and allows said primary piston to exhaust through said duct $f'$ into the main exhaust, as explained. When the primary piston makes a stroke of nine thirty-seconds of an inch, the communication between the port $f$ and the duct $f'$ is cut off, so that the entrapped steam will form a confined-steam cushion for the primary piston. If, however, the piston continues its movement to the right one-eighth of an inch farther, the port $h$ (which extends clear through the primary shell-piston, as well as longitudinally to the end) will be brought into communication with the live-steam-cushion duct $h''$, which extends from the point half-way between the steam-supply duct $c$ and the exhaust-duct $d'$ in the auxiliary steam-chest down to the main steam-supply, which will admit live steam from said duct $h''$ through the port $h$ into the end of the auxiliary cylinder and form a live-steam cushion for the primary valve-piston.

The ports and ducts hereinbefore described are exactly duplicated in both ends of the engine, so that the operation is precisely the same for each stroke. But one set of these ports and ducts have been described, however. The same parts are lettered the same at the opposite ends, and it is thought the construction will be clearly understood.

The ports are all so arranged that if the pistons should stop the instant they are cut off the ports in the opposite end will be opened sufficiently to take steam enough for reversing the piston and making the return stroke. For this reason my improved valve-motion is just as positive in starting as the duplex pump, and it can be used very satisfactorily for automatic purposes, as there is no part of the stroke at which the ports are not opened sufficiently to operate the pump properly.

The stroke of the primary piston brings into communication the steam-supply duct $c$ and the steam-port $c'$ for supplying live steam and the exhaust-duct $f'$ into communication with the exhaust-port $f$ in readiness for the reverse stroke.

I will now more particularly describe the action of the secondary valve-piston, which has been hereinbefore incidentally referred to. It will be remembered that the exhaust-duct $e'$ leads from the exhaust end of the secondary piston over to the opposite end of the main steam-chest, where it communicates with the main exhaust, and also that the steam-supply duct $c$ for said secondary valve-piston leads from the same end of said main steam-chest up to the steam end of the valve-piston. It will also be remembered that the main exhaust is cored out a little to one side to form a communication between it and the exhaust-duct $e'$, so that when the main piston is in the opposite end of its steam-chest and in readiness to begin its return stroke both of the ducts $c$ and $e'$ are in communication with the exhaust end of the main steam-chest. As has already been explained, the secondary valve-piston is held between two confined-steam cushions at the end of each of its strokes; but just as soon as the primary valve-piston shifts in the manner already explained the ducts $c$ and $e'$ are both brought into communication with the exhaust end of the main steam-chest, and both ends of the secondary valve-piston are thereby exposed to the same amount of pressure, which will hold the secondary piston stationary in readiness for its return stroke, which will be taken as soon as the main piston has completed its outward stroke and opened the duct $c$ for the passage of live steam.

I have made my main steam-cylinder what is commonly called a "five-port cylinder" for the purpose of giving the main piston a cushion at the end of each of its strokes. This cushioning action will be clearly understood upon reference to Fig. II. Assuming that the main piston is traveling to the left on its outward stroke, taking steam through the main steam-duct $b$ and the small steam-duct $a$ on the right-hand end of the steam-chest and exhausting through the main duct $b$ on the left-hand end, (the small port $a$ on the left-hand end being closed by the projecting lip $i$ of the slide-valve,) it will be observed that when the piston has traveled far enough to the left to cut off the exhaust it will be cushioned upon the steam entrapped in the outer end of the cylinder. When the main piston makes its return stroke, the slide-valve is shifted by the valve-pistons in the manner already explained, which opens both the small duct $a$ and the main duct $b$ on the left-hand end of the cylinder, and the piston is started by the steam passing through the small duct $a$ and is moved thereby until the piston passes over the duct $b$ and allows the full head of steam to enter the cylinder. At the end of its return stroke the piston is cushioned in the same manner as on its outward stroke. The ports and ducts are so arranged that just as the duct $c$ begins to open for admitting steam to the secondary piston the main exhaust $b$ is closed and the main piston-head cushioned. This arrangement makes a very uniform stroke of the main piston, for however slow the pump may be running the main piston must travel on until it uncovers the duct $c$ before the slide-valve will shift, and in speeding the pump the cushion will stop the main piston at the end of each stroke, so that the variations in the stroke of the piston for the different speeds will be comparatively nothing.

In case the pump stands at rest for some time the valve-pistons as ordinarily constructed are liable to rust to a slight extent, causing them to stick and rendering it necessary to start them by mechanical means. I propose to obviate this difficulty in two ways. In the first place I propose to brass-line the auxiliary steam-chest and also the inside of the primary valve-piston, so as to bring a brass and iron surface together in case of both pistons, making it impossible for them to become rusty and stick to each other, and, moreover, as there is more expansion to the brass than iron when heated, (the brass being on the outside of or surrounding the iron,) when steam is admitted to the cylinders after the pump has been at rest for some time it will be found to be in readiness for starting and free from all sticking. In addition to this I propose to provide an improved mechanical starting device.

L is a boss formed on the inside of the secondary valve-piston K and having a three-eighth-inch hole drilled into it.

M is a rock-shaft journaled in suitable bearings in the top of the auxiliary steam-chest and having its end $m$ extending from one side thereof and provided with a perforation $m'$.

N is a screw-cap adapted to be secured to the auxiliary steam-chest in a suitable screw-threaded socket, so as to cover the projecting end of the rock-shaft M, and provided with a transverse opening $n$ through it, adapted to register with the opening $m$ of the rock-shaft and receive an operating-rod, which passes through said openings and by means of which the rock-shaft is moved.

O is a crank-arm keyed to the rock-shaft M and extending down into engagement with the hole in the boss L, the lower end of said crank-arm being rounded at $o$ to lessen the friction. By moving the rock-shaft in its bearings it is quite clear that the valve-pistons will be shifted. As above explained, the upper portion of the primary shell-piston is slotted or cut away at $J^3$, which allows the passage of the crank-arm O. A suitable packing is provided between the cap N and the projecting end of the rock-shaft to afford a steam-tight joint. The packing and nut thus cover the only movable part of the mechanism which is visible, excepting the main piston-rod between the pump-cylinder and the main steam-chest.

P is a removable screw-cap inserted in the top of the auxiliary steam-chest and provided with an opening P, adapted to receive a lubricator of any approved form for lubricating the several parts of the mechanism.

The secondary valve-piston responds very quickly when it receives steam from the main cylinder, because it has no work to do except overcome its own friction, which is very slight. I have equalized its action by cutting out a portion of the piston at its center, so as to give it a steam area on top and increase its friction. In very large engines I prefer to make this secondary valve-piston of two piston-heads connected by a tie-rod. This last-mentioned construction has been found to be particularly advantageous for vertical pumps for mining purposes, as the packing-rings of the piston-heads can be set out sufficiently to increase the friction, so that the piston will support its own weight.

The auxiliary steam-chest is made reversible, so that it can be turned end for end by simply removing the holding-down bolts and turning the same. This is desirable, so as to enable the starting device of the engine to be placed on the most convenient side.

A valve-motion constructed substantially as above described is automatic in every respect, and all extraneous operating mechanism is entirely done away with.

Having thus fully described my invention and the manner of carrying the same into practice, the following is what I claim as new therein and desire to secure by Letters Patent:

1. The combination of the main cylinder, the slide-valve governing the steam supply and exhaust of said cylinder, an auxiliary steam-cylinder, a primary shell-piston working in said auxiliary cylinder and having an opening through its bottom wall, a secondary valve-piston supported in the primary shell-piston and having a longitudinal groove in its under side, an arm or rib extending from the slide-valve and engaging the opening in the primary shell-piston and the groove in the secondary valve-piston, and a main piston working in the main cylinder, substantially as and for the purpose set forth.

2. The combination of the main cylinder, an auxiliary steam-cylinder, a primary shell-piston working in said auxiliary steam-cylinder and governing the steam supply and exhaust of said main cylinder, a secondary valve-piston working in the primary shell-piston and controlling the supply of steam thereto, steam-supply ducts extending from the main cylinder to the opposite ends of the primary shell-piston and communicating with the ends of the secondary valve-piston, independent exhaust-ducts extending from the ends of the primary shell-piston to the ends of the main cylinder, each of said ducts extending to the end of said main cylinder which is opposite to the end of the shell-piston from which it leads, and a main piston working in the main cylinder, substantially as and for the purpose set forth.

3. The combination of the main cylinder, an auxiliary steam-cylinder, a primary shell-piston working in said auxiliary cylinder and governing the steam supply and exhaust of said main cylinder, a secondary valve-piston working in the primary shell-piston and controlling the supply of steam thereto, the duct $c$, ports $c'$, and ports $c''$, extending longitudinally through the secondary valve-piston to its ends, suitable steam-supplies for said primary shell-piston, suitable exhausts for said primary and secondary pistons, and the main piston working in the main cylinder, substantially as set forth.

4. The combination of the main cylinder, an auxiliary cylinder, a primary shell-piston working in said auxiliary cylinder and governing the steam supply and exhaust of said main cylinder, a hollow secondary valve-piston supported in said primary shell-piston, suitable steam supply and exhaust ducts for said secondary valve-piston, the ports $d$, ducts $d'$, and a steam-supply to the inside of said secondary valve-piston, substantially as set forth.

5. The combination of the main cylinder, an auxiliary cylinder, a primary shell-piston working in said auxiliary cylinder and governing the steam supply and exhaust of said main cylinder, a hollow secondary valve-piston working in said primary shell-piston, a steam-supply to said hollow secondary piston, steam-supply ducts $c$, steam-supply ports $c'$, $c''$, and $d$, steam-supply ducts $d'$, suitable independent exhausts for said primary and secondary valve-pistons, and the main piston working in the main cylinder, substantially as set forth.

6. The combination of the main cylinder and the piston therein, the auxiliary cylinder, the primary shell-piston working in said auxiliary cylinder and governing the steam supply and exhaust of said cylinder, the secondary hollow valve-piston working in the primary shell-piston and controlling the steam-supply thereto, a steam-supply to the inside of said secondary hollow piston, the ducts $c$ and ports $c'$ and $c''$, suitable exhausts adapted to be cut off by the movement of the secondary valve-piston before the end of its stroke, and the ports $d$ and live-steam-cushion ports $g$, substantially as and for the purpose set forth.

7. The combination of the main cylinder and the piston therein, the auxiliary cylinder, the primary shell-piston working in said auxiliary cylinder and governing the steam supply and exhaust of said cylinder, the secondary valve-piston working in said primary shell-piston, the ducts $c$, ports $c'$ $c''$, arranged so as to be cut off by the movement of the secondary valve-piston, the exhaust-ports $e$ and ducts $e'$, also adapted to be cut off by the movement of the secondary piston, whereby the secondary piston will be held between two confined-steam-cushions, and suitable means for moving the primary shell-piston and throwing both ends thereof into communication with the exhaust end of the main cylinder, substantially as set forth.

8. The combination of the main cylinder and the piston therein, the auxiliary cylinder, the primary shell-piston working in said auxiliary cylinder and governing the steam supply and exhaust of said cylinder, the slide-valve, the secondary valve-piston working in said primary shell-piston, suitable steam-supplies for operating both of said valve-pistons, the exhaust-ports $f$, the ducts $f'$, the ports $h$, and the recesses $h'$ in the sides of the secondary valve-piston, all arranged and adapted to operate substantially in the manner set forth.

9. The combination of the main cylinder formed with the ducts $a$ and $b$, the slide-valve provided with projecting lips $i$, the auxiliary cylinder, the primary valve-cylinder supported in said auxiliary cylinder, the supplemental valve-piston supported in said primary valve-cylinder, the steam-supply ducts $c$, and the exhaust-ducts $e$ and $f$, arranged in suitable relation with said primary and secondary valve-pistons, whereby the main piston working in the main cylinder will be cushioned at the end of its stroke at the moment the steam-supply ducts are opened for admitting steam to the valve-pistons for shifting the slide-valve, substantially as and in the manner hereinbefore set forth.

WILLIAM H. BLAKE.

Witnesses:
M. K. WHIPPLE,
H. S. HOWE.